(12) United States Patent
Bae et al.

(10) Patent No.: US 11,394,098 B2
(45) Date of Patent: Jul. 19, 2022

(54) WAVEGUIDE INCLUDING A FIRST DIELECTRIC PART COVERED IN PART BY A CONDUCTIVE PART AND A SECOND DIELECTRIC PART SURROUNDING THE FIRST DIELECTRIC PART AND THE CONDUCTIVE PART

(71) Applicant: Korea Advanced Institute Of Science And Technology, Daejeon (KR)

(72) Inventors: Hyeon Min Bae, Daejeon (KR); Ha Il Song, Daejeon (KR)

(73) Assignee: Korea Advanced Institute Of Science And Technology, Daejeon (KR)

( * ) Notice: Subject to any disclaimer, the term of this patent is extended or adjusted under 35 U.S.C. 154(b) by 10 days.

(21) Appl. No.: 17/036,668

(22) Filed: Sep. 29, 2020

(65) Prior Publication Data

US 2021/0013575 A1 Jan. 14, 2021

Related U.S. Application Data

(63) Continuation of application No. PCT/KR2019/004149, filed on Apr. 8, 2019.

(30) Foreign Application Priority Data

Apr. 6, 2018 (KR) .................. 10-2018-0040476

(51) Int. Cl.
*H01P 3/16* (2006.01)
*H01P 3/12* (2006.01)
*H01P 3/127* (2006.01)

(52) U.S. Cl.
CPC ............... *H01P 3/16* (2013.01); *H01P 3/122* (2013.01); *H01P 3/127* (2013.01)

(58) Field of Classification Search
CPC .. H01P 3/16; H01P 3/165; H01P 3/121; H01P 3/122

(Continued)

(56) References Cited

U.S. PATENT DOCUMENTS 7,301,424 B2 * 11/2007 Suarez-Gartner et al. .................. H01P 3/127 333/239
2014/0368301 A1 * 12/2014 Herbsommer et al. ... H01P 3/16 333/239

(Continued)

FOREIGN PATENT DOCUMENTS

JP S58150301 A 9/1983
JP H01254002 A 10/1989

(Continued)

OTHER PUBLICATIONS

Haisu Li, et al., "Low loss and single mode metal dielectric hybrid-clad waveguides for Terahertz radiation," Proceedings of the SPIE, Micro+Nano Materials, Devices, and Systems, vol. 9668, Dec. 22, 2015.

*Primary Examiner* — Benny T Lee
(74) *Attorney, Agent, or Firm* — Dinsmore & Shohl LLP; Yongsok Choi, Esq.

(57) ABSTRACT

According to one aspect of the invention, there is provided a waveguide for transmission of electromagnetic wave signals, comprising: a first dielectric part comprising a dielectric; a conductor part covering a part of the first dielectric part; and a second dielectric part surrounding the first dielectric part and the conductor part.

6 Claims, 6 Drawing Sheets

(58) Field of Classification Search
USPC .......................................................... 333/239
See application file for complete search history.

(56) References Cited

U.S. PATENT DOCUMENTS

| | | | |
|---|---|---|---|
| 2015/0295299 A1 | 10/2015 | Herbsommer | |
| 2015/0295300 A1 | 10/2015 | Herbsommer et al. | |
| 2017/0170538 A1* | 6/2017 | Morgan et al. ........... | H01P 3/16 |
| 2018/0097268 A1 | 4/2018 | Oster et al. | |
| 2018/0097269 A1* | 4/2018 | Dogiamis et al. ...... | G06F 1/182 |
| 2018/0226714 A1* | 8/2018 | Apostolos et al. ....... | H01P 3/16 |

FOREIGN PATENT DOCUMENTS

| | | | |
|---|---|---|---|
| JP | 2000332503 A | 11/2000 |
| JP | 2008028523 A | 2/2008 |
| KR | 1020150023791 A | 3/2015 |
| KR | 1020170112901 A | 10/2017 |

\* cited by examiner

FIG. 1

PRIOR ART

FIG. 4 phase change come from the round trip and reflection at the boundaries
→ constructive interference $2k_x d_1 + 2\varphi_1 = 2\pi m_x \quad (m_x = 0, 1, 2, ...)$ $2k_y d_2 + 2\varphi_2 = 2\pi m_y \quad (m_y = 0, 1, 2, ...)$ phase shift at the boundary
$\varphi_1, \varphi_2 = \pi$ – fundamental mode ($m_x = 0, m_y = 1$)

$k_x = -\dfrac{\pi}{d_1} \qquad k_y = 0$ $k^2 = k_x^2 + k_y^2 + k_z^2$ $\quad = k_x^2 + \beta^2$ $\rightarrow \beta^2 = k^2 - k_x^2 = (\omega/c_1)^2 - (\pi/d_1)^2$

(Group delay)

$\Rightarrow \dfrac{d\beta}{d\omega} = \dfrac{\omega}{c_1^2 \beta} = \dfrac{\omega}{c_1^2} (k^2 - k_x^2)^{-\frac{1}{2}} = \dfrac{\omega}{c_1^2} \dfrac{1}{\sqrt{\left(\dfrac{\omega}{c_1}\right)^2 - \left(\dfrac{\pi}{d_1}\right)^2}} = \dfrac{1}{c_1 \sqrt{1 - \left(\dfrac{c_1 \pi}{\omega d_1}\right)^2}} \propto \dfrac{1/c_1}{\sqrt{1 - \dfrac{a}{\omega^2}}}$ ↑ from Maxwell eq.

(dependent on $\omega$)

FIG. 5 phase change come from the round trip and reflection at the boundaries
→ constructive interference $2k_x d_1 + 2\varphi_1 = 2\pi m_x \quad (m_x = 0,1,2,...)$
$2k_y d_2 + 2\varphi_2 = 2\pi m_y \quad (m_y = 0,1,2,...)$ phase shift at the boundary $\tan\left(\frac{\varphi_1}{2}\right) = \left(\frac{\sin^2 \bar{\theta}_c}{\sin^2 \theta} - 1\right)^{1/2}$ — fundamental mode ($m_x = 0, m_y = 1$)

$k_x = -\frac{\varphi_1}{d_1} \quad k_y = 0$ $k^2 = k_x^2 + k_y^2 + k_z^2$
$= k_x^2 + \beta^2$ $\rightarrow \beta^2 = k^2 - k_x^2 = (\omega/c_1)^2 - (\varphi_1/d_1)^2$ (Group delay)

$\Rightarrow \dfrac{d\beta}{d\omega} = \dfrac{\omega}{c_1^2 \beta} = \dfrac{\omega}{c_1^2}(k^2 - k_x^2)^{-\frac{1}{2}} = \dfrac{\omega}{c_1^2} \dfrac{1}{\sqrt{\left(\dfrac{\omega}{c_1}\right)^2 - \left(\dfrac{\varphi_1}{d_1}\right)^2}} \approx \dfrac{1}{c_1}$ (not dependent on $\omega$)

↑ from Maxwell eq.

WAVEGUIDE INCLUDING A FIRST DIELECTRIC PART COVERED IN PART BY A CONDUCTIVE PART AND A SECOND DIELECTRIC PART SURROUNDING THE FIRST DIELECTRIC PART AND THE CONDUCTIVE PART

CROSS-REFERENCE TO RELATED APPLICATIONS

This application is a continuation application of Patent Cooperation Treaty (PCT) international application Serial No. PCT/KR2019/004149, filed on Apr. 8, 2019, which claims priority to Korean Patent Application Serial No. 10-2018-0040476, filed on Apr. 6, 2018. The entire contents of PCT international application Serial No. PCT/KR2019/004149 and Korean Patent Application Serial No. 10-2018-0040476 are hereby incorporated by reference.

FIELD OF THE INVENTION

The present invention relates to a waveguide for transmission of electromagnetic wave signals.

BACKGROUND

As data traffic is rapidly increased, data transmission/receipt speed of input/output (I/O) bus connecting integrated circuits is also being quickly increased. For the last decades, conductor-based interconnects (e.g., copper wires) with high cost and power efficiencies have been widely applied to wired communication systems. However, such conductor-based interconnects have inherent limitations in channel bandwidths due to skin effect caused by electromagnetic induction.

Meanwhile, optic-based interconnects with high data transmission/reception speed have been introduced and widely used as an alternative to the conductor-based interconnects. However, the optic-based interconnects have limitations in that they cannot completely replace the conductor-based interconnects because the costs of installation and maintenance thereof are very high.

Recently, a new type of interconnect comprising a waveguide composed of dielectric has been introduced. Since the new type of interconnect (so-called "e-tube") has advantages of both of metal and dielectric, this interconnect has high cost and power efficiencies and enables high-speed data communication within a short range. Thus, such an interconnect has come into the spotlight as an interconnect employable in chip-to-chip communication.

However, even when a conventional dielectric waveguide is used, there is a problem that a great change or variation in a group delay is caused by a non-linear phase response, or that bit errors are caused by increasing a data transfer rate (or bandwidth).

In this regard, the inventor(s) present a technique for a novel and inventive waveguide that can mitigate non-linearity of phase responses and prevent bit errors from occurring in a high-speed data communication environment.

SUMMARY OF THE INVENTION

One object of the present invention is to solve all the above-described problems.

Another object of the invention is to provide a waveguide comprising a first dielectric part, a conductor part, and a second dielectric part, wherein the conductor part covers a part of the first dielectric part and the second dielectric part surrounds all of the first dielectric part and the conductor part, so that both of dielectric-conductor boundary conditions and dielectric-dielectric boundary conditions exist as boundary conditions applied to a signal transmitted through the waveguide.

The representative configurations of the invention to achieve the above objects are described below.

According to one aspect of the invention, there is provided a waveguide for transmission of electromagnetic wave signals, comprising: a first dielectric part comprising a dielectric; a conductor part covering a part of the first dielectric part; and a second dielectric part surrounding the first dielectric part and the conductor part.

In addition, there are further provided other waveguides to implement the invention.

According to the invention, both of dielectric-conductor boundary conditions and dielectric-dielectric boundary conditions may exist as boundary conditions applied to a signal transmitted through a waveguide, so that linearity of phase responses occurring in the signal transmitted through the waveguide may be increased.

According to the invention, it is possible to mitigate non-linearity of phase responses in communication using a waveguide, so that the degree of change in a group delay according to a frequency change may be reduced.

According to the invention, it is possible to make a non-dispersive signal transmission channel via a waveguide, so that intersymbol interference (ISI) may be reduced and the frequency with which bit errors occur as a data transfer rate is increased may be drastically reduced.

DETAILED DESCRIPTION OF THE INVENTION

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the locations or arrangements of individual elements within each of the disclosed embodiments may also be modified without departing from the spirit and scope of the invention. Therefore, the following detailed description is not to be taken in a limiting sense, and the scope of the invention, if properly described, is limited only by the appended claims together with all equivalents thereof. In the drawings, like reference numerals refer to the same or similar functions throughout the several views.

Hereinafter, preferred embodiments of the present invention will be described in detail with reference to the accompanying drawings to enable those skilled in the art to easily implement the invention.

Configuration of the Waveguide

Hereinafter, the internal configuration of a waveguide crucial for implementing the present invention and the functions of the respective components thereof will be discussed.

Figure 1:
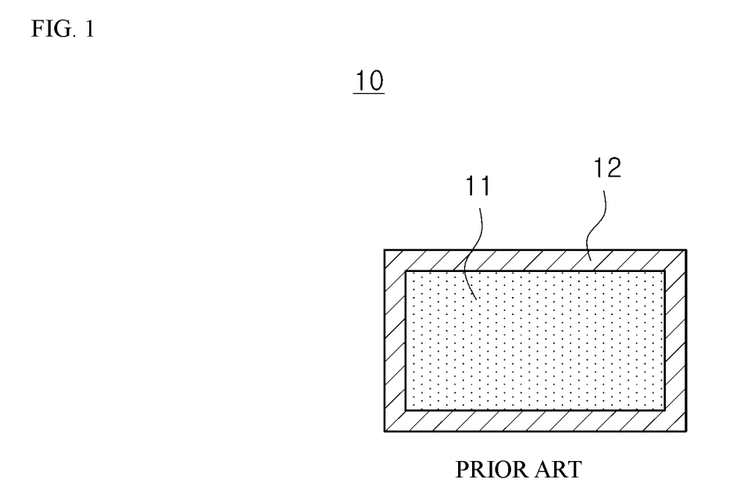
FIG. 1 illustratively shows the configuration of a waveguide according to prior art.

FIG. 1 illustratively shows the configuration of a waveguide according to prior art.

Referring to FIG. 1, the waveguide 10 according to prior art may comprise a dielectric core 11 and a conductor cladding 12 surrounding the dielectric core 11.

When signals are transmitted using the waveguide according to prior art, there may arise problems that a great change or variation in a group delay is caused by a non-linear phase response, and that the frequency with which bit errors occur is increased as a data transfer rate is increased in an actual communication environment.

Figure 2:
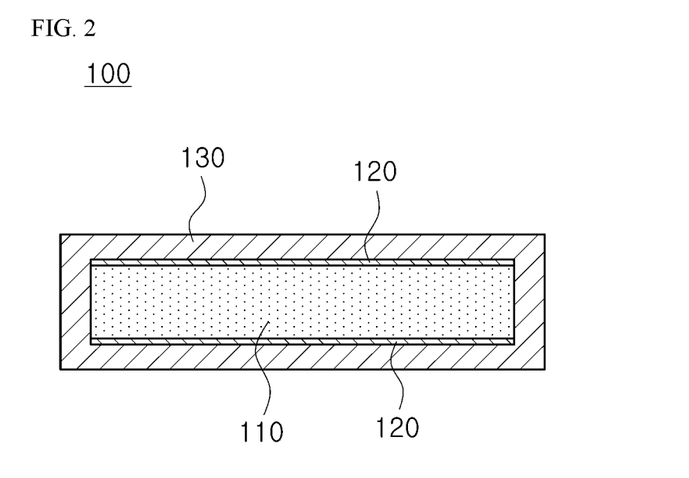
FIG. 2 illustratively shows the configuration of a waveguide according to one embodiment of the invention.

FIG. 2 illustratively shows the configuration of a waveguide according to one embodiment of the invention.

Referring to FIG. 2, a waveguide 100 according to one embodiment of the invention may comprise a first dielectric part 110 comprising a dielectric; a conductor part 120 covering a part of the first dielectric part 110; and a second dielectric part 130 surrounding the first dielectric part 110 and the conductor part 120. Here, according to one embodiment of the invention, the dielectrics included in the first dielectric part 110 and the second dielectric part 130 may have different permittivity.

Specifically, according to one embodiment of the invention, the conductor part 120 may be formed to cover some of a plurality of outer surfaces of the first dielectric part 110.

More specifically, according to one embodiment of the invention, the central axes of the first dielectric part 110, the conductor part 120 and the second dielectric part 130 may coincide with each other.

For example, as shown in FIG. 2, the first dielectric part 110 may be in the form of a rectangular core and the conductor part 120 may be in the form of a cladding covering two of four surfaces (i.e., upper and lower surfaces) of the first dielectric part 110 in the form of the rectangular core, while the second dielectric part 130 may be in the form of a rectangular jacket surrounding all of the first dielectric part 110 and the conductor part 120, as seen from a cross-section cut along a direction perpendicular to the length of the waveguide 100 according to one embodiment of the invention.

However, it is noted that the internal configuration or shape of the waveguide 100 according to the invention is not necessarily limited to those mentioned above, and may be changed without limitation as long as the objects of the invention can be achieved.

Figure 3A:
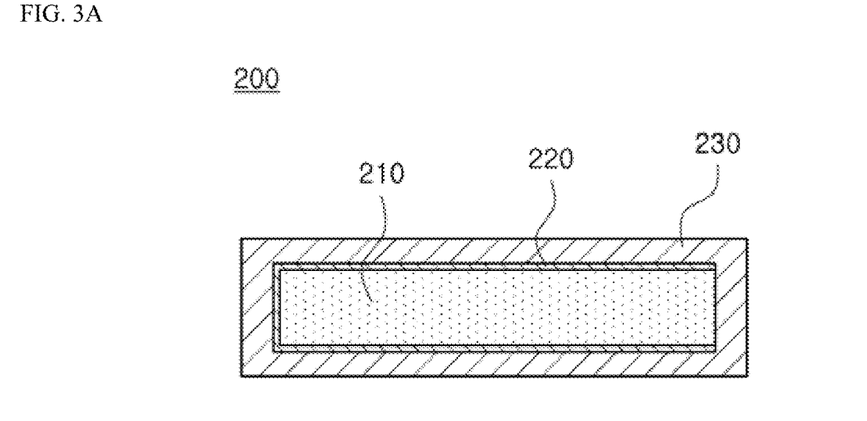
FIG. 3A illustratively shows the configurations of waveguides according to another embodiment of the invention.
Figure 3B:
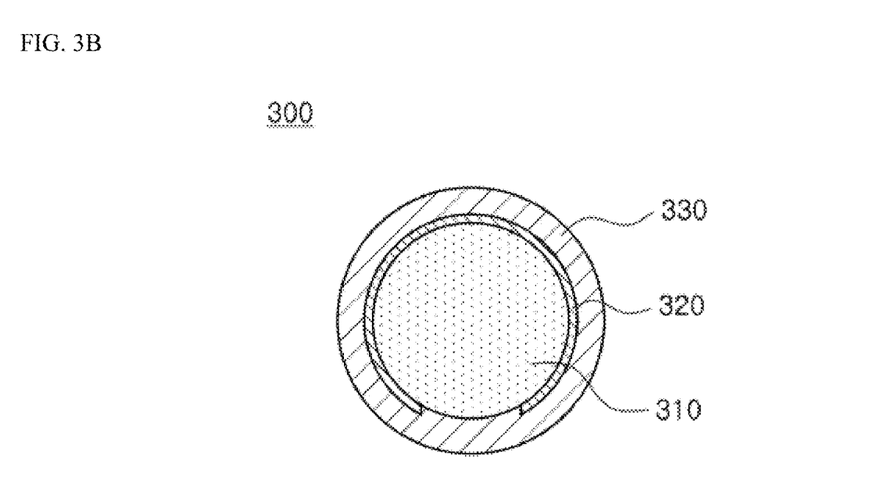
FIG. 3B illustratively shows the configurations of waveguides according to another embodiment of the invention.

FIGS. 3A and 3B illustratively show the configurations of waveguides according to another embodiment of the invention.

First, referring to FIG. 3A, in the case of a waveguide 200 according to another embodiment of the invention, a first dielectric part 210 may be in the form of a rectangular core and a conductor part 220 may be in the form of a cladding covering three of four surfaces (i.e., upper, lower and left surfaces) of the first dielectric part 210 in the form of the rectangular core, while a second dielectric part 230 may be in the form of a rectangular jacket surrounding all of the first dielectric part 210 and the conductor part 220.

Next, referring to FIG. 3B, in the case of a waveguide 300 according to another embodiment of the invention, a first dielectric part 310 may be in the form of a circular core and a conductor part 320 may be in the form of a cladding covering a part of an outer surface (corresponding to predetermined angles about the central axis) of the first dielectric part 310 in the form of the circular core, while a second dielectric part 330 may be in the form of an annular jacket surrounding all of the first dielectric part 310 and the conductor part 320.

Meanwhile, according to yet another embodiment of the invention, it may be assumed that a plurality of waveguides are included in a single cable. Even in this case, the waveguides may be formed such that both of dielectric-dielectric boundary conditions and dielectric-conductor boundary conditions exist.

Figure 7A:
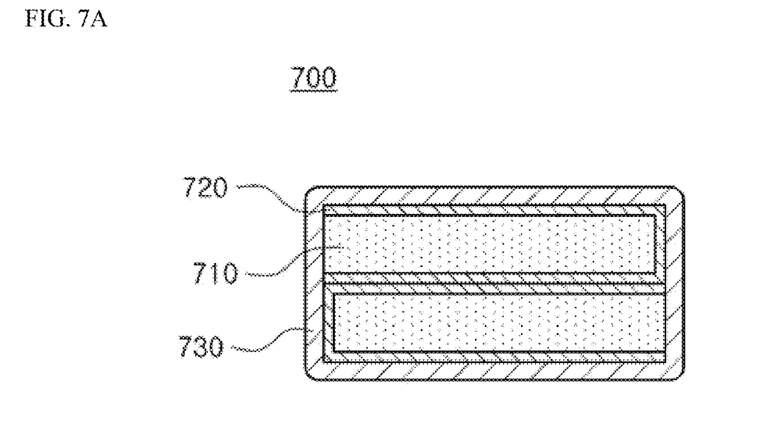
FIG. 7A illustratively shows the configurations of waveguides according to yet another embodiment of the invention.
Figure 7B:
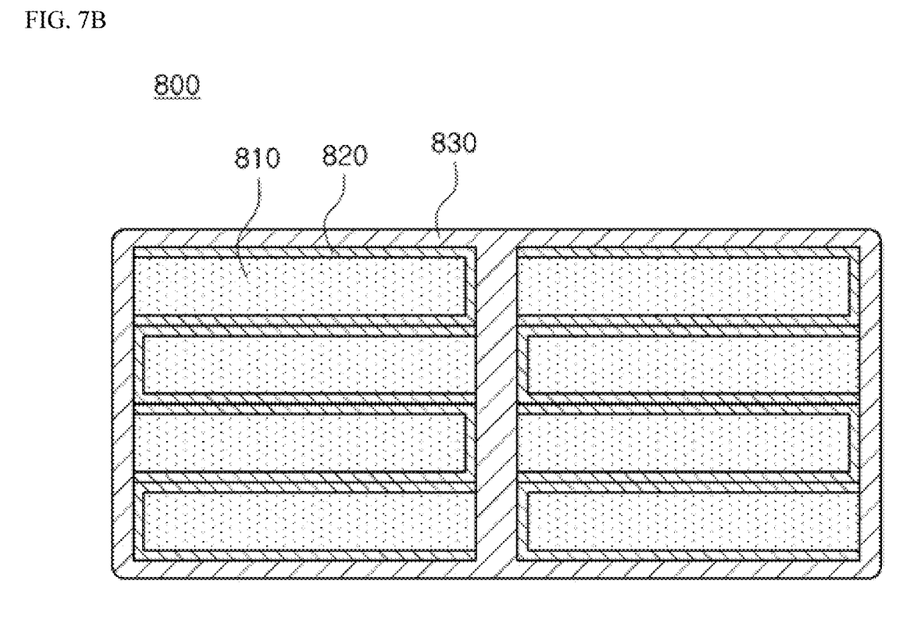
FIG. 7B illustratively shows the configurations of waveguides according to yet another embodiment of the invention.

FIGS. 7A and 7B illustratively show the configurations of waveguides according to yet another embodiment of the invention.

First, referring to FIG. 7A, in the case of a waveguide 700 according to yet another embodiment of the invention, a first dielectric part 710 may be in the form of a rectangular core and a conductor part 720 may be in the form of a cladding covering three of four surfaces (i.e., upper, lower and left surfaces) of the first dielectric part 710 in the form of the rectangular core, while two waveguide units each comprising the first dielectric part 710 and the conductor part 720 may be disposed adjacent to each other, and a second dielectric part 730 may be in the form of a rectangular jacket surrounding all of the two waveguide units each comprising the first dielectric part 710 and the conductor part 720.

Next, referring to FIG. 7B, in the case of a waveguide 800 according to yet another embodiment of the invention, a first dielectric part 810 may be in the form of a rectangular core and a conductor part 820 may be in the form of a cladding covering three of four surfaces (i.e., upper, lower and left surfaces) of the first dielectric part 810 in the form of the rectangular core, while a plurality of waveguide units each comprising the first dielectric part 810 and the conductor part 820 may be disposed in a predetermined arrangement, and a second dielectric part 830 may be in the form of a rectangular jacket surrounding all of the plurality of waveguide units each comprising the first dielectric part 810 and the conductor part 820.

That is, as shown in FIGS. 7A and 7B, in the case of the waveguides according to yet another embodiment of the invention, even when a plurality of waveguide units are included in a single cable jacket, dielectric-dielectric boundary conditions and dielectric-conductor boundary conditions may exist in each of the plurality of waveguide units.

Meanwhile, according to one embodiment of the invention, the conductor part 120 may consist of a material having electrical conductivity. For example, the conductor part 120 according to one embodiment of the invention may consist of a metallic material such as copper (Cu) which is traditionally in wide use, or may consist of a non-metallic material such as graphene.

Meanwhile, according to one embodiment of the invention as shown in FIG. 2, the permittivity of the first dielectric part 110 may be greater or less than that of the second dielectric part 130. For example, the first dielectric part 110 may consist of TEFLON™ having a dielectric constant of about 2.0, and the second dielectric part 130 may consist of polyethylene having a dielectric constant of about 1.2. Further, as another example, the first dielectric part 110 may consist of air having a dielectric constant of about 1.0, and the second dielectric part 130 may consist of TEFLON™ having a dielectric constant of about 2.0. Conversely, the first dielectric part 110 may consist of TEFLON™ and the second dielectric part 130 may consist of air.

Therefore, according to one embodiment of the invention as shown in FIG. 2, a signal transmitted through the waveguide 100 (i.e., an electromagnetic wave) may be guided not only along a boundary between the first dielectric part 110 and the conductor part 120, but also along a boundary between the first dielectric part 110 and the second dielectric part 130 having different permittivity. That is, since both of dielectric-conductor boundary conditions and dielectric-dielectric boundary conditions may exist in the case of the waveguide 100 according to one embodiment of the invention, linearity of phase responses occurring in a signal transmission channel via the waveguide may be drastically increased, and thus the degree to which a group delay is changed (or dispersed) according to a frequency change may be drastically reduced. Further, since a non-dispersive signal transmission channel may be made in the case of the waveguide 100 according to one embodiment of the invention, intersymbol interference (ISI) may be reduced and no bit errors may occur even when a data transfer rate is increased. The group delay will be discussed in detail below.

Figure 4:
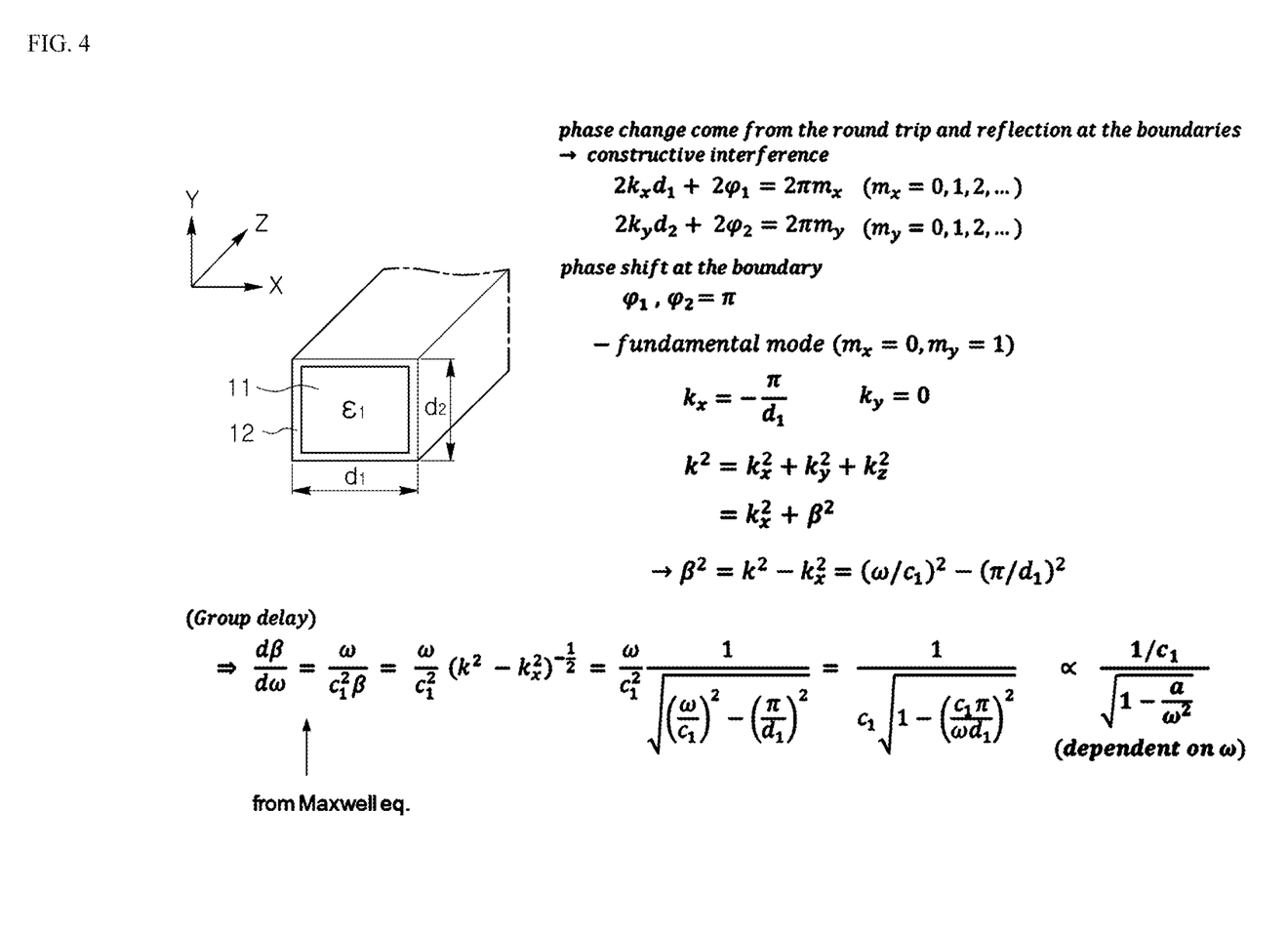
FIG. 4 shows how to estimate a group delay that may occur in a waveguide according to prior art, and a group delay that may occur in a waveguide according to one embodiment of the invention.
Figure 5:
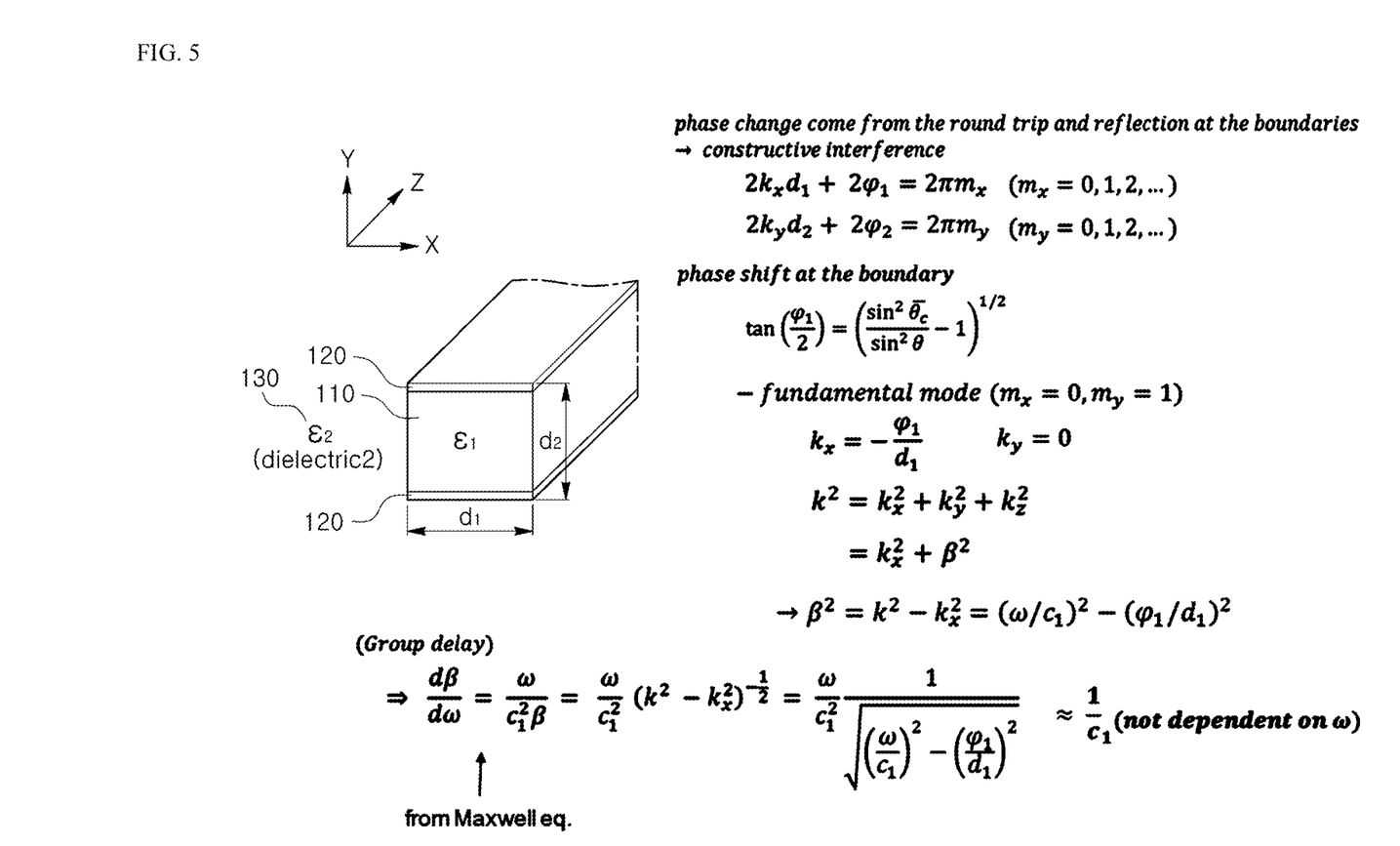
FIG. 5 shows how to estimate a group delay that may occur in a waveguide according to prior art, and a group delay that may occur in a waveguide according to one embodiment of the invention.

FIGS. 4 and 5 show how to estimate a group delay that may occur in a waveguide according to prior art, and a group delay that may occur in a waveguide according to one embodiment of the invention. Specifically, FIGS. 4 and 5 describe phase change come from the round trip and reflection at the boundaries of the waveguide, phase shift at the boundary, and the group delay that may occur in the waveguide in terms of equations.

First, referring to FIG. 4, in the case of the waveguide according to prior art (i.e., the waveguide comprising the dielectric core 11 and the conductor cladding 12 surrounding all of the dielectric core 11), it may be estimated that the group delay is affected by a change in a frequency $\omega$ (i.e., the group delay is changed as the frequency is changed).

Next, referring to FIG. 5, in the case of the waveguide according to one embodiment of the invention (i.e., the waveguide comprising the first dielectric part 110, the conductor part 120 covering a part of the first dielectric part 110, and the second dielectric part 130 surrounding all of the first dielectric part 110 and the conductor part 120), it may be assumed that the group delay is not affected by a change in a frequency $\omega$ (i.e., the group delay is almost unchanged even when the frequency is changed).

Figure 6A:
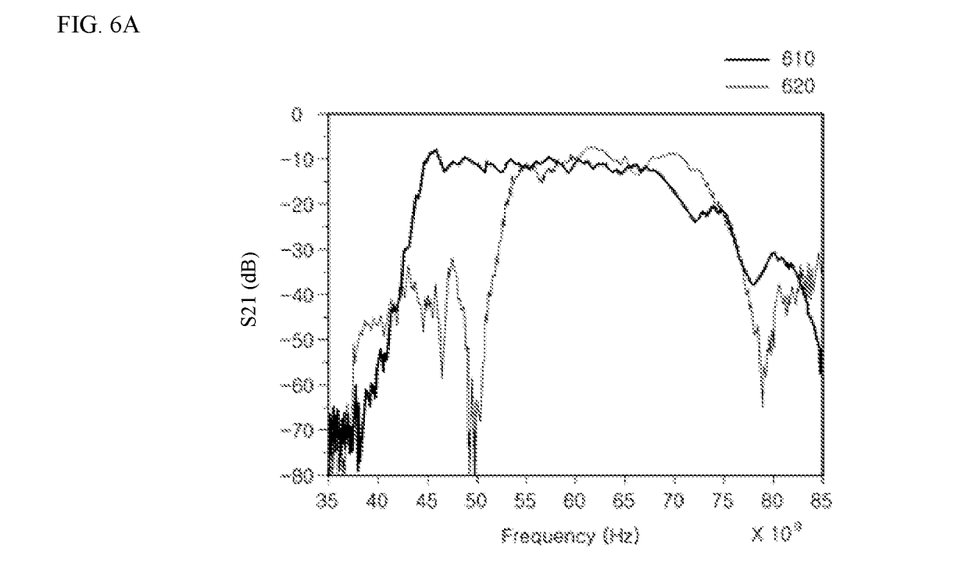
FIG. 6A shows results of tests in which a group delay is measured for each of the cases where signals are transmitted/received using a waveguide according to the invention and using a waveguide according to prior art.
Figure 6B:
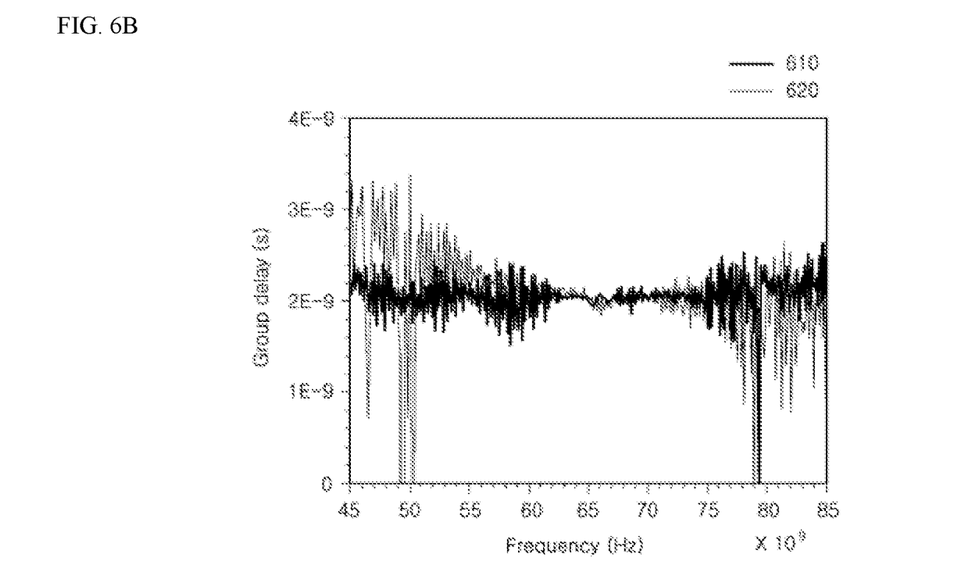
FIG. 6B shows results of tests in which a group delay is measured for each of the cases where signals are transmitted/received using a waveguide according to the invention and using a waveguide according to prior art.

FIGS. 6A and 6B show results of tests in which a group delay is measured for each of the cases where signals are transmitted/received using a waveguide according to the invention and using a waveguide according to prior art.

First, referring to a S21 graph shown in FIG. 6A, it can be seen that upper corner frequencies or upper cutoff frequencies are substantially the same in a test result 610 for the waveguide according to one embodiment of the invention (i.e., the waveguide comprising the first dielectric part 110, the conductor part 120 covering a part of the first dielectric part 110, and the second dielectric part 130 surrounding all of the first dielectric part 110 and the conductor part 120) (more specifically, the waveguide having a structure as shown in FIG. 3A) and a test result 620 for the waveguide according to prior art (i.e., the waveguide comprising the dielectric core 11 and the conductor cladding 12 surrounding all of the dielectric core 11 as shown in FIG. 1). The x-axis of the S21 graph shown in FIG. 6A represents a frequency in Hz, and the y-axis of the S21 graph shown in FIG. 6A represents a value of S21 parameter in decibel (dB). The x-axis of the S21 graph shown in FIG. 6B represents a frequency in Hz, and the y-axis of the S21 graph shown in FIG. 6B represents a group delay in second.

Next, referring to a group delay graph shown in FIG. 6B, when the waveguide according to prior art is employed, non-linear phase responses may occur, which may increase the degree of change in a group delay according to a change in a frequency in a signal transmission channel via the waveguide. Actually, referring to FIG. 6B, in a test result 620 for the waveguide according to prior art, it can be seen that the degree to which the group delay is changed as the frequency is changed in the frequency band in the graph is relatively large.

Referring further to the group delay graph shown in FIG. 6B, when the waveguide according to the invention is employed, non-linearity of phase responses may be reduced, which may drastically reduce the degree of change in a group delay according to a change in a frequency in a signal transmission channel via the waveguide. Actually, referring to FIG. 6B, in a test result 610 for the waveguide according to the invention, it can be seen that the degree to which the group delay is changed as the frequency is changed in the frequency band in the graph is significantly small.

Therefore, from the above test results, it can be seen that when the waveguide 100 according to the invention is employed, the change (or variation) in the group delay of a transmission signal, which may occur as the frequency is changed, may be drastically reduced.

Although details or parameters for the components included in the waveguide according to the invention have been described above in detail, it is noted that the configuration of the waveguide according to the invention is not necessarily limited to those configurations mentioned above, and may be changed without limitation as long as the objects or effects of the invention can be achieved.

Although the present invention has been described in terms of specific items such as detailed elements as well as the limited embodiments and the drawings, the embodiments are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A waveguide for transmission of electromagnetic wave signals, comprising:
   a first dielectric part comprising at least one dielectric;
   a conductor part covering a part of the first dielectric part; and
   a second dielectric part comprising at least one dielectric and surrounding the first dielectric part and the conductor part,
   wherein a change in a group delay, which occurs according to a frequency change in a signal transmission channel via the waveguide, does not exceed a predetermined level.

2. The waveguide of claim 1, wherein the conductor part covers some of a plurality of outer surfaces of the first dielectric part.

3. The waveguide of claim 2, wherein respective central axes of the first dielectric part, the conductor part and the second dielectric part coincide with each other.

4. The waveguide of claim 1, wherein the at least one dielectric included in the first dielectric part and the at least one dielectric included in the second dielectric part have different permittivity.

5. The waveguide of claim 1, wherein a signal transmitted through the waveguide is guided along a boundary between the first dielectric part and the conductor part, and a boundary between the first dielectric part and the second dielectric part.

6. A waveguide for transmission of electromagnetic wave signals, comprising:
   a first dielectric part comprising at least one dielectric;
   a conductor part covering a part of the first dielectric part; and
   a second dielectric part comprising at least one dielectric and surrounding the first dielectric part and the conductor part,
   wherein a boundary is formed between the first dielectric part and the conductor part and a boundary is formed between the first dielectric part and the second dielectric part, and
   wherein an area of the boundary formed between the first dielectric part and the conductor part is larger than an area of the boundary formed between the first dielectric part and the second dielectric part.

* * * * *